United States Patent
Hirata (10) Patent No.: US 9,712,897 B2
(45) Date of Patent: Jul. 18, 2017

(54) COMMUNICATION DEVICE, RECEIVING DEVICE, AND COMMUNICATION SYSTEM FOR TRANSMITTING INFORMATION IN DAISY CHAIN NETWORK

(71) Applicant: Panasonic Intellectual Property Management Co., Ltd., Osaka (JP)

(72) Inventor: Yuuki Hirata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/065,984

(22) Filed: Mar. 10, 2016

(65) Prior Publication Data
US 2016/0269095 A1 Sep. 15, 2016

(30) Foreign Application Priority Data
Mar. 13, 2015 (JP) ................................. 2015-050143

(51) Int. Cl.
| | | |
|---|---|---|
| *H01M 10/42* | (2006.01) | |
| *H04Q 9/00* | (2006.01) | |
| *G08C 23/06* | (2006.01) | |
| *G06F 13/42* | (2006.01) | |

(52) U.S. Cl.
CPC ........... *H04Q 9/00* (2013.01); *G06F 13/4247* (2013.01); *G08C 23/06* (2013.01); *G05B 2219/33226* (2013.01); *G06F 13/4252* (2013.01); *H01M 2010/4271* (2013.01); *H01M 2010/4278* (2013.01); *H04Q 2209/30* (2013.01)

(58) Field of Classification Search
CPC ....... H01M 2010/4278; H01M 10/425; H01M 2010/4271; G01R 31/3658; G06F 13/4247; G06F 13/4252; G06F 13/426; H04Q 9/00; H04Q 2209/30; G08C 23/06; G05B 19/408; G05B 2219/33226; H04B 7/155
IPC .................................................. H01M 2010/43
See application file for complete search history.

(56) References Cited

U.S. PATENT DOCUMENTS

| | | | | |
|---|---|---|---|---|
| 9,158,727 B2* | 10/2015 | Gorbold | .............. | G06F 12/0661 |
| 9,294,300 B2* | 3/2016 | Janz | | |
| 2004/0008996 A1* | 1/2004 | Aronson | .............. | G02B 6/4246 398/202 |

(Continued)

FOREIGN PATENT DOCUMENTS

WO WO 2011/043311 A1 4/2011

OTHER PUBLICATIONS

Texas Instruments "3 to 3 series Cell Lithium-Ion Battery Monitor and Secondary Protection IC for EV and HEV Applications", Jul. 2010, pp. 1-59.*

(Continued)

*Primary Examiner* — Sophia Vlahos
(74) *Attorney, Agent, or Firm* — Renner, Otto, Boisselle & Sklar, LLP (57) ABSTRACT

A communication device is included in a daisy chain connection. A receiver receives a first signal from a preceding device in the daisy chain connection. A transmitter transmits the first signal received in the receiver to a succeeding device in the daisy chain connection. An acceptor accepts a second signal starting from the communication device. The transmitter transmits the second signal accepted in the acceptor to the succeeding device at a transmission rate higher than a transmission rate of the first signal received in the receiver.

19 Claims, 7 Drawing Sheets

(56) References Cited

U.S. PATENT DOCUMENTS

| | | | |
|---|---|---|---|
| 2004/0160206 A1 | 8/2004 | Komaki et al. | |
| 2010/0259221 A1* | 10/2010 | Tabatowski-Bush | H02J 7/0021 320/134 |
| 2011/0004427 A1* | 1/2011 | Gorbold | G01R 31/3658 702/63 |
| 2013/0002016 A1* | 1/2013 | Furukawa | H01M 10/425 307/9.1 |
| 2013/0108898 A1* | 5/2013 | Potts | H02J 7/0013 429/50 |
| 2014/0129164 A1* | 5/2014 | Gorbold | G01R 31/362 702/63 |
| 2015/0019771 A1* | 1/2015 | Greef | H01M 10/425 710/105 |
| 2015/0042283 A1* | 2/2015 | Camp | H02J 7/0018 320/121 |
| 2015/0104673 A1* | 4/2015 | de Greef | H04L 12/437 429/7 |
| 2016/0226107 A1* | 8/2016 | Worry | H01M 10/425 |

OTHER PUBLICATIONS

Extended European Search Report for corresponding European Application No. 16159426.2 dated Sep. 6, 2016.

* cited by examiner

FIG. 7

COMMUNICATION DEVICE, RECEIVING DEVICE, AND COMMUNICATION SYSTEM FOR TRANSMITTING INFORMATION IN DAISY CHAIN NETWORK

CROSS-REFERENCE TO RELATED APPLICATION

This application is based upon and claims the benefit of priority from the prior Japanese Patent Application No. 2015-50143, filed on Mar. 13, 2015, the entire contents of which are incorporated herein by reference.

BACKGROUND

1. Field

The disclosure relates to communication technology, and particularly to a communication device, a receiving device, and a communication system for transmitting information in a daisy chain network.

2. Description of the Related Art

In order to transmit voltage values of a plurality of battery cells to a microcomputer, a communication interface is provided in each of the battery cells. A plurality of communication interfaces is serially connected, and each of the communication interfaces transfers the voltage values (refer to WO 11/043311 A, for example).

As a connection mode for transmitting voltage values of a plurality of battery cells to a microcomputer, there is a daisy chain connection. In the daisy chain connection, a plurality of communication interfaces is connected in an annular pattern like one ring. For example, a daisy chain connection starting from a management device returns to the management device as an ending point via a plurality of communication interfaces.

Consequently, in a communication interface located closer to the ending point, there is an increasing amount of information received from other communication interface and to be transferred, and a transfer amount is larger than that in a communication interface located closer to the starting point. Accordingly, power consumption in a communication interface located closer to the ending point is larger than that in a communication interface located closer to the starting point.

SUMMARY

The present invention has been made in view of the situation described above, and an object of the present invention is to provide a technique with which power consumption in a daisy chain connection is leveled.

In order to solve the above problem, a communication device in an aspect of the present invention is included in a daisy chain connection, and includes a receiver, a transmitter, and an acceptor. The receiver receives a first signal from a preceding device in the daisy chain connection, the transmitter transmits the first signal received in the receiver to a succeeding device in the daisy chain connection, and the acceptor accepts a second signal starting from the communication device. The transmitter transmits the second signal to the succeeding device at a transmission rate higher than that of the first signal.

Another aspect of the present invention is a receiving device. The device includes a receiver and a processor. The receiver receives a signal from each of a plurality of communication devices included in a daisy chain connection, for which signal a plurality of kinds of transmission rates is used. The processor processes the signal received in the receiver. A reference signal for identifying a transmission rate, which signal has a common value irrespective of the transmission rate, is included in the signal received in the receiver. The receiver receives the signal at each of the plurality of kinds of transmission rates, and selects a transmission rate at which the reference signal for identifying a transmission rate has been detected.

Still another aspect of the present invention is a communication system. The communication system includes a management device, and a plurality of communication devices daisy-chained from the management device. Each of the plurality of communication devices transfers a signal received from a preceding device in the daisy chain connection to a succeeding device in the daisy chain connection, and transmits, to the succeeding device, a signal starting from the communication device at a transmission rate higher than that used for the transfer.

Any combination of the above components, those in which the expression in the present invention has been converted among methods, devices, systems, and the like, are also effective as an aspect of the present invention.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

The invention will now be described by reference to the preferred embodiments. This does not intend to limit the scope of the present invention, but to exemplify the invention.

Prior to specific description of the present invention, an outline thereof is described. An embodiment of the present invention relates to a communication system in which communication devices provided in a plurality of battery packs, respectively, are daisy-chained. In the daisy chain connection, a communication device transmits a packet signal including predetermined information to a succeeding communication device. The succeeding communication device transmits a new packet signal including predetermined information to a communication device further succeeding the succeeding communication device, and transfers the packet signal received from the preceding communication device to the communication device further succeeding the succeeding communication device.

In the manner described above, each communication device performs, in addition to transmission of a new packet signal, transfer of a packet signal. Accordingly, a communication time required for transmission of a packet signal is longer in a communication device located closer to the ending point of the daisy chain connection, than in a communication device located closer to the starting point thereof.

In a case of performing optical communication for transmitting and transferring a packet signal, the longer a communication time, the longer a light-emitting time, and accordingly, power consumption increases. Power is supplied to the communication device by a battery pack. Therefore, a remaining battery power varies among battery packs depending on a difference in power consumption. In a case where a power storage system is formed by connecting a plurality of battery packs, in general, a remaining battery power in each battery pack is preferably leveled among the battery packs, and it is not preferable that the remaining battery power in each battery pack vary among the battery packs as a result of communication.

In order to deal with this problem, the communication device according to the embodiment uses a transmission rate for transferring a packet signal from a communication device located closer to an ending point of a daisy chain connection, which transmission rate is higher than a transmission rate for transferring a packet signal from a communication device located closer to a starting point thereof. For example, a communication device located closer to the starting point (hereinafter referred to as "first communication device") transmits a packet signal at a transmission rate of 9600 bps, and other communication devices in the daisy chain connection transfer the packet signal at a transmission rate of 9600 bps. On the other hand, a communication device located closer to the ending point than the first communication device (hereinafter referred to as "second communication device") transmits a packet signal at a transmission rate of 19200 bps, which is higher than 9600 bps. In addition, the second communication device transfers the packet signal from the first communication device at a transmission rate of 9600 bps, as described above.

Figure 1:
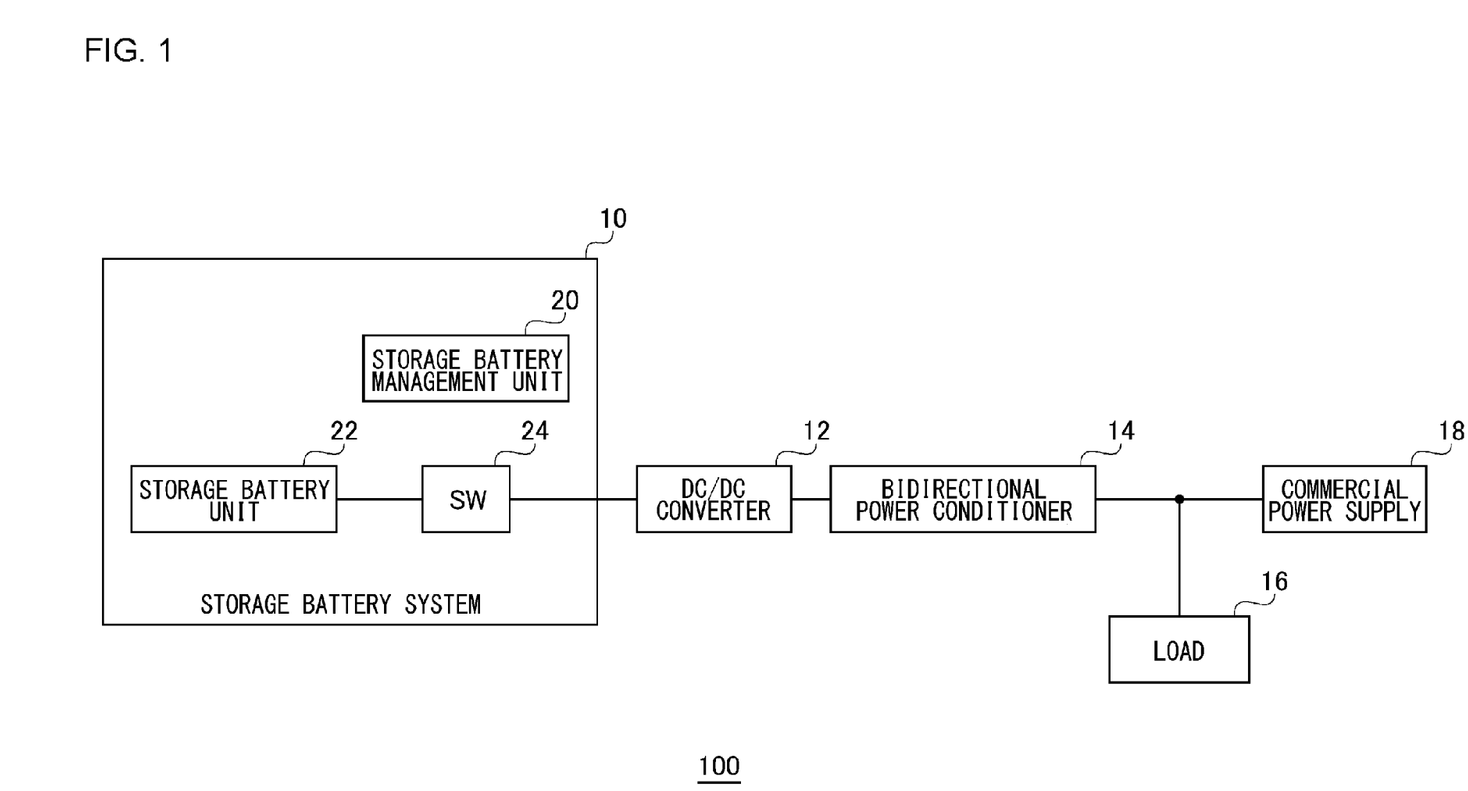
FIG. 1 is a diagram illustrating a configuration of a power distribution system according to an embodiment of the present invention.

In FIG. 1, a configuration of a power distribution system 100 according to the embodiment of the present invention is illustrated. The power distribution system 100 includes a storage battery system 10, a DC/DC converter 12, a bidirectional power conditioner 14, a load 16, and a commercial power supply 18. The storage battery system 10 includes a storage battery management unit 20, a storage battery unit 22, and a switch (SW) 24.

The commercial power supply 18 is an AC power supply and power is supplied from a power company. The storage battery system 10 includes the storage battery unit 22 which includes a plurality of battery packs not illustrated. Here, for the sake of clearer description, one storage battery unit 22 is provided.

However, a plurality of the storage battery units 22 may be provided. The SW 24 is provided between the storage battery unit 22 and the DC/DC converter 12, and connects and disconnects a conductive path between the storage battery unit 22 and the DC/DC converter 12. The storage battery management unit 20 manages each battery pack included in the storage battery unit 22, and also manages an operation of the SW 24. The management of the storage battery unit 22 by the storage battery management unit 20 will be described later.

The DC/DC converter 12 is disposed in a conductive path between the SW 24 and the bidirectional power conditioner 14, steps up or steps down the DC power converted by the bidirectional power conditioner 14, and causes the storage battery system 10 to charge or discharge power.

One end of the bidirectional power conditioner 14 is connected to the DC/DC converter 12, and another end thereof is connected to the commercial power supply 18. The bidirectional power conditioner 14 includes a bidirectional inverter not illustrated. The inverter converts, to AC power, the DC power from the DC/DC converter 12, which DC power is discharged by the storage battery system 10, and outputs the AC power to the load 16. On the other hand, the inverter converts the AC power from the commercial power supply 18 to DC power, and outputs the DC power to the DC/DC converter 12. The load 16 operates when AC power is supplied thereto from the commercial power supply 18 or the bidirectional power conditioner 14.

Figure 2:
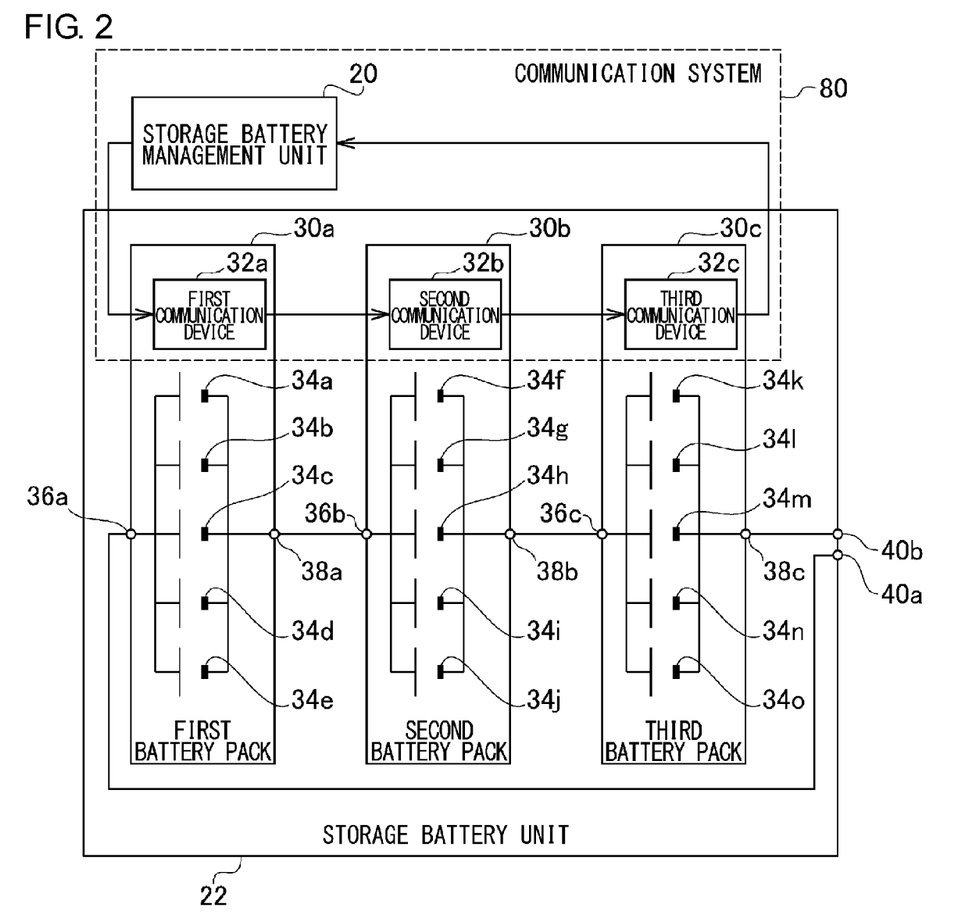
FIG. 2 is a diagram illustrating a connection between a storage battery unit and a storage battery management unit of FIG. 1.

FIG. 2 illustrates a connection between the storage battery unit 22 and the storage battery management unit 20. The storage battery unit 22 includes a first battery pack 30a, a second battery pack 30b, and a third battery pack 30c, which are collectively referred to as a battery pack 30, as well as a first terminal 40a and a second terminal 40b, which are collectively referred to as a terminal 40. The first battery pack 30a includes a first communication device 32a, a first storage battery 34a, a second storage battery 34b, a third storage battery 34c, a fourth storage battery 34d, a fifth storage battery 34e, a first positive electrode terminal 36a, and a first negative electrode terminal 38a. The second battery pack 30b includes a second communication device 32b, a sixth storage battery 34f, a seventh storage battery 34g, an eighth storage battery 34h, a ninth storage battery 34i, a tenth storage battery 34j, a second positive electrode terminal 36b, and a second negative electrode terminal 38b. The third battery pack 30c includes a third communication device 32c, an eleventh storage battery 34k, a twelfth storage battery 34l, a thirteenth storage battery 34m, a fourteenth storage battery 34n, a fifteenth storage battery 34o, a third positive electrode terminal 36c, and a third negative electrode terminal 38c.

Here, the first communication device 32a, the second communication device 32b, and the third communication device 32c are collectively referred to as a communication device 32.

The first storage battery 34a to the fifteenth storage battery 34o are collectively referred to as a storage battery 34. The first positive electrode terminal 36a, the second positive electrode terminal 36b, and the third positive electrode terminal 36c are collectively referred to as a positive electrode terminal 36. The first negative electrode terminal 38a, the second negative electrode terminal 38b, and the third negative electrode terminal 38c are collectively referred to as a negative electrode terminal 38. A communication system 80 includes the storage battery management unit 20, the first communication device 32a, the second communication device 32b, and the third communication device 32c. The storage battery unit 22 includes three battery packs 30, and the battery pack 30 includes five storage batteries 34.

However, the number of the battery packs 30 included in the storage battery unit 22, and the number of the storage batteries 34 included in the battery pack 30 are not limited to the above numbers.

In each of the battery packs 30, five storage batteries 34 are connected in parallel. A positive electrode of the storage battery 34 is connected to the positive electrode terminal 36, and a negative electrode of the storage battery 34 is connected to the negative electrode terminal 38. In addition, the positive electrode terminal 36 and the negative electrode terminal 38 are connected between adjacent storage batteries 34 in such a way that the first negative electrode terminal 38a and the second positive electrode terminal 36b are connected, and the second negative electrode terminal 38b and the third positive electrode terminal 36c are connected. By the connection described above, three combinations of parallel-connected five storage batteries 34 are connected in series. In addition, these are connected to a first terminal 40a and a second terminal 40b. Furthermore, the first terminal 40a and the second terminal 40b are connected to the SW 24 not illustrated. In FIG. 2, the storage battery unit 22 is connected to the SW 24 by two terminals 40. In FIG. 1, however, the storage battery unit 22 is connected to the SW 24 by one line. This is simply a difference in notation caused by a difference between FIG. 2 and FIG. 1. The positive electrode and the negative electrode are distinguished from each other in FIG. 2, but not in FIG. 1.

The storage battery management unit 20 acquires various physical amounts of the battery pack 30, such as a state of charge (SOC) and a temperature of each battery pack 30, and provides the acquired physical amounts to the bidirectional power conditioner 14 not illustrated. In addition, the storage battery management unit 20 controls the battery pack 30 based on the acquired physical amounts. For example, the storage battery management unit 20 controls a fan (not illustrated) for cooling the battery pack 30 to cool the battery pack 30. As described above, the storage battery management unit 20 functions as a management device for controlling the battery pack 30.

In the communication system 80, a plurality of the communication devices 32 is daisy-chained from the storage battery management unit 20. Specifically, the storage battery management unit 20 connects to the first communication device 32a, the first communication device 32a connects to the second communication device 32b, the second communication device 32b connects to the third communication device 32c, and the third communication device 32c connects to the storage battery management unit 20. In a manner described above, the storage battery management unit 20, the first communication device 32a, the second communication device 32b, the third communication device 32c, and the storage battery management unit 20 are connected in a row in this order, whereby a daisy chain connection is formed.

In the daisy chain connection, an optical fiber is used in a path between the storage battery management unit 20 and the communication device 32, and a path between adjacent communication devices 32. The storage battery management unit 20 performs optical communication with each communication device 32 by using a predetermined communication protocol. A unique address (hereinafter referred to as "ID") is assigned to each communication device 32. The storage battery management unit 20 identifies each communication device 32 using the ID. The storage battery management unit 20 transmits, to the communication device 32, a packet signal including the ID and a command for identifying a physical amount to be acquired, in accordance with the predetermined communication protocol.

Figure 3:
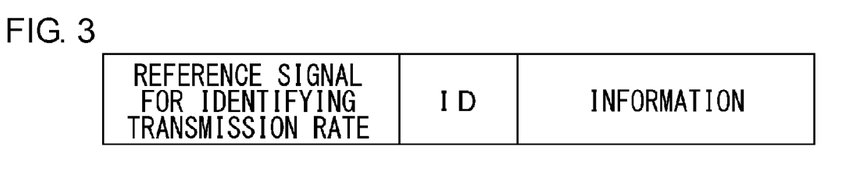
FIG. 3 is a diagram illustrating a format of a packet signal transmitted/received in a communication system of FIG. 2.

FIG. 3 illustrates a format of a packet signal transmitted/received in the communication system 80. In the packet signal, a reference signal for identifying a transmission rate, an ID, and information are included in this order. The reference signal for identifying a transmission rate has a common value irrespective of the transmission rate, which will be described later. In the information, for example, a command is included. A field other than those illustrated in FIG. 3 may be disposed in the packet signal. Return to FIG. 2.

When the storage battery management unit 20 transmits a packet signal to the communication device 32, the communication device 32 receives the packet signal and acquires an ID included in the received packet signal. The communication device 32 checks the acquired ID against an ID assigned to the communication device 32. When the acquired ID and the assigned ID are identical, the communication device 32 executes the command included in the received packet signal, and generates a packet signal including data of the result of the execution. The data corresponds to the physical amount described above and is included in the information in the packet signal. The communication device 32 transmits the generated packet signal to a succeeding communication device 32. On the other hand, when the acquired ID and the ID assigned to the communication device 32 are not identical, the communication device 32 transfers the received packet signal to the succeeding communication device 32. In the manner as described above, each communication device 32 transmits the packet signal including data corresponding to the command included in the packet signal addressed thereto, and transfers the packet signal not addressed thereto.

In an environment of such an annular daisy chain connection, an amount of data to be transmitted is larger in a communication device 32 located closer to the ending point of the daisy chain connection than in a communication device 32 located closer to the starting point of the daisy chain connection.

Specifically, the amount of data to be transmitted is larger in the third communication device 32c than in the first communication device 32a. The packet signals to be transmitted by the first communication device 32a are a packet signal including data regarding the first battery pack 30a, and packet signals including commands for the second communication device 32b and the third communication device 32c, respectively. On the other hand, the packet signals to be transmitted by the third communication device 32c are packet signals including data regarding the first battery pack 30a, the second battery pack 30b, and the third battery pack 30c, respectively. The data amount in the packet signal including the data regarding the battery pack 30 is larger than that in the packet signal including the command.

Since optical communication is used for the communication in the communication system 80, a light emitting diode (LED) for communication (not illustrated) is provided in the storage battery management unit 20 and each of the communication devices 32, and a packet signal is transmitted by blinking the LED for communication. Consequently, the larger the amount of data to be transmitted in the communication device 32, the larger the power consumption in the communication device 32. Here, the power consumption is larger in the communication device 32 located closer to the ending point of the daisy chain connection than in the communication device 32 located closer to the starting point of the daisy chain connection.

Figure 4:
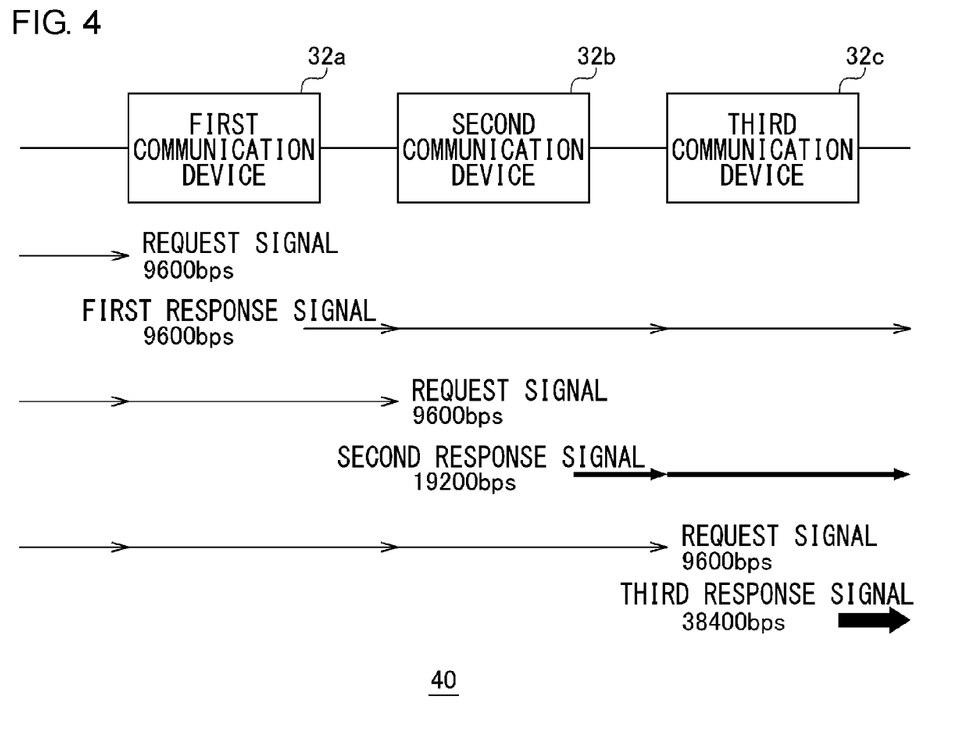
FIG. 4 is a diagram illustrating an outline of processing performed by the communication system of FIG. 2.

In order to reduce the imbalance in the power consumption among the communication devices 32, the communication system 80 executes the following processing. FIG. 4 illustrates an outline of processing performed by the communication system 80. Here, only the first communication device 32a, the second communication device 32b, and the third communication device 32c in FIG. 2 are illustrated. To the left side of the first communication device 32a, the storage battery management unit 20 which is a starting point of the daisy chain connection is disposed, and to the right side of the third communication device 32c, the storage battery management unit 20 which is an ending point of the daisy chain connection is disposed. A request signal, which is a packet signal including the command described above, is transmitted from the storage battery management unit 20. The transmission rate in the transmission is 9600 bps. In a case where the request signal is addressed to the first communication device 32a, the first communication device 32a transmits, to the second communication device 32b, a first response signal, which is a packet signal including data corresponding to the command. The transmission rate in the transmission is 9600 bps. The first response signal is transferred by the second communication device 32b and the third communication device 32c, and reaches the storage battery management unit 20. The transmission rate in the transmission is maintained at 9600 bps, as well.

In a case where the request signal is addressed to the second communication device 32b, the first communication device 32a transfers the request signal, and the second communication device 32b receives the request signal. The transmission rate in the transmission is maintained at 9600 bps, as well. The second communication device 32b transmits, to the third communication device 32c, a second response signal, which is a packet signal including data corresponding to the command.

The transmission rate in the transmission is 19200 bps. The second response signal is transferred by the third communication device 32c, and reaches the storage battery management unit 20.

The transmission rate in the transmission is maintained at 19200 bps, as well. In a case where the request signal is addressed to the third communication device 32c, the first communication device 32a and the second communication device 32b transfer the request signal, and the third communication device 32c receives the request signal. The transmission rate in the transmission is maintained at 9600 bps, as well. The third communication device 32c transmits, to the storage battery management unit 20, a third response signal, which is a packet signal including data corresponding to the command. The transmission rate in the transmission is 38400 bps.

As described above, while maintaining the transmission rate of the packet signal received from the preceding device in the daisy chain connection, each of the communication devices 32 transfers the packet signal to the succeeding device in the daisy chain connection. The preceding device and the succeeding device correspond to the storage battery management unit 20 or another communication device 32. In addition, the communication device 32 transmits, to the succeeding device, a packet signal starting from the communication device 32 at a transmission rate higher than that used for the transfer. The closer the communication device 32 is located to the ending point in the daisy chain connection, the higher transmission rate the communication device 32 uses. Therefore, a time for transmission other than transfer is shortened, and an increase in power consumption is suppressed.

When a packet signal is transferred by the communication device 32, a waveform of the signal is distorted.

The distortion is increased in proportion to the number of times of transfer. When the distortion is increased, an error is more likely to occur in transmission of the packet signal. It is effective to decrease the transmission rate to reduce the probability of the error. Here, the number of times of transfer of the packet signal starting from the first communication device 32a is two, the number of times of transfer of the packet signal starting from the second communication device 32b is one, and the number of times of transfer of the packet signal starting from the third communication device 32c is zero. Therefore, the following expression is satisfied: the transmission rate of the packet signal starting from the first communication device 32a<the transmission rate of the packet signal starting from the second communication device 32b<the transmission rate of the packet signal starting from the third communication device 32c.

The storage battery management unit 20 receives the packet signal from the third communication device 32c. The transmission rate of the packet signal is any one of 9600 bps, 19200 bps, and 38400 bps. The storage battery management unit 20 receives the packet signal at each of a plurality of kinds of transmission rates used in the daisy chain connection, and selects a transmission rate at which a reference signal for identifying a transmission rate has been detected. This processing will be described later. The storage battery management unit 20 acquires data included in the received packet signal, as described above.

Figure 5:
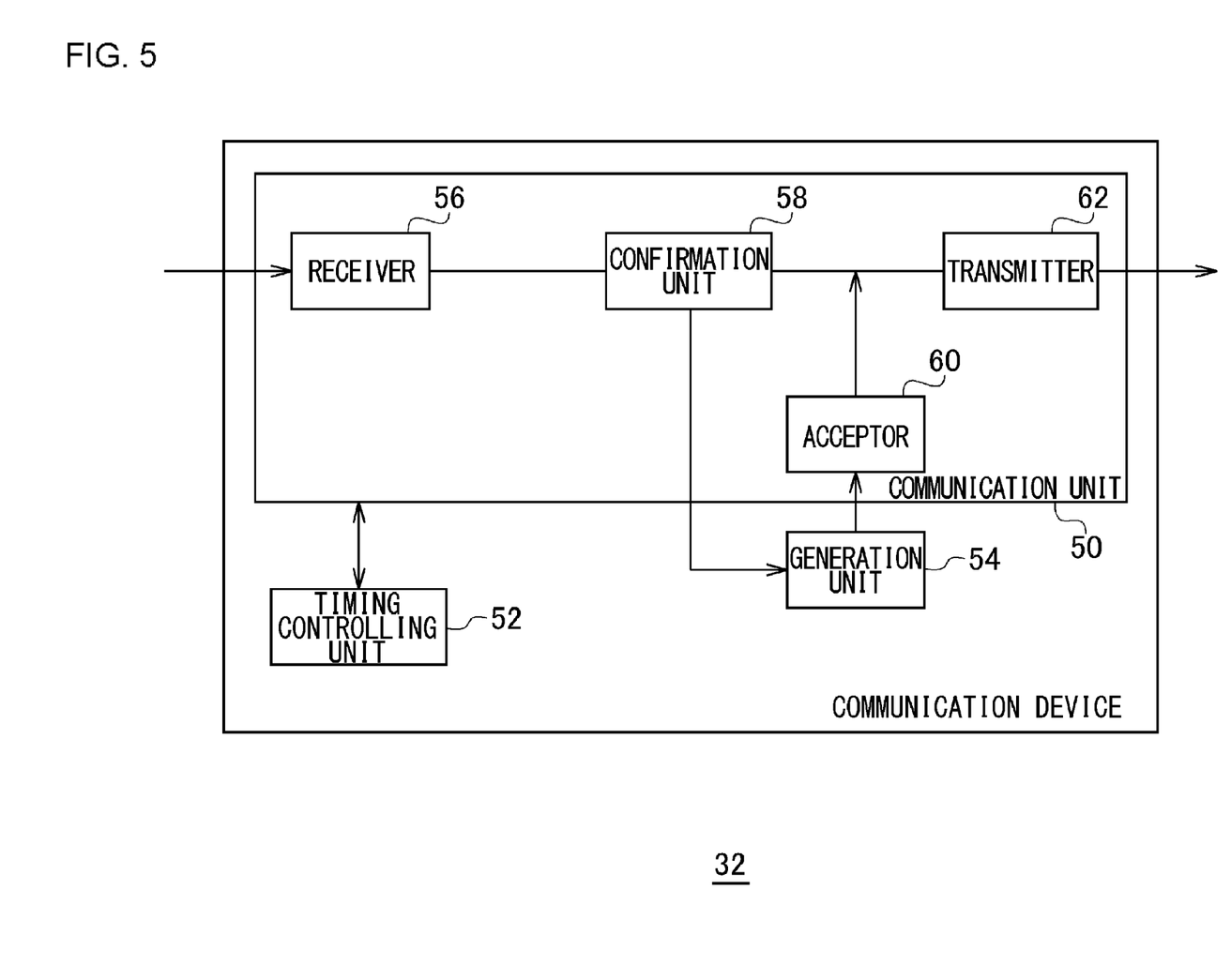
FIG. 5 is a diagram illustrating a configuration of the communication device of FIG. 2.

FIG. 5 illustrates a configuration of the communication device 32. The communication device 32 includes a communication unit 50, a timing controlling unit 52, and a generation unit 54. The communication unit 50 includes a receiver 56, a confirmation unit 58, an acceptor 60, and a transmitter 62. The receiver 56 is a light-receiver, and receives a packet signal from another communication device 32 or the storage battery management unit 20 not illustrated, in other words, the preceding device in the daisy chain connection. The packet signal is an optical signal. In addition, the receiver 56 has an optical/electric (O/E) conversion function, and converts the packet signal from an optical signal to an electric signal. The receiver 56 outputs the packet signal which has been converted to the electric signal. Here, the packet signal which has been converted to the electric signal is also referred to as a first signal. The first signal corresponds to the request signal or the response signal from another communication device 32 described above.

Figure 6A:
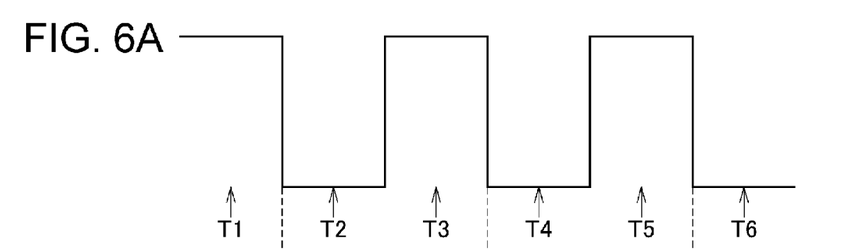
FIGS. 6A to 6C are diagrams illustrating an outline of an operation in the communication device of FIG. 5.
Figure 6B:
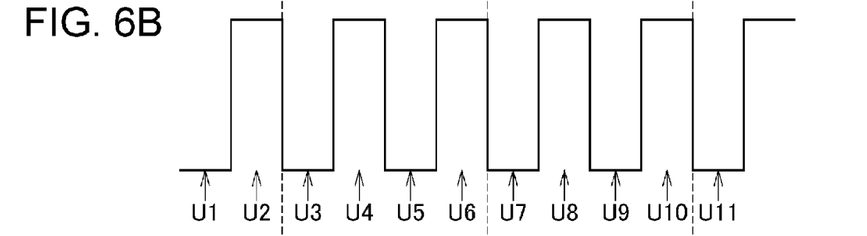
Figure 6C:
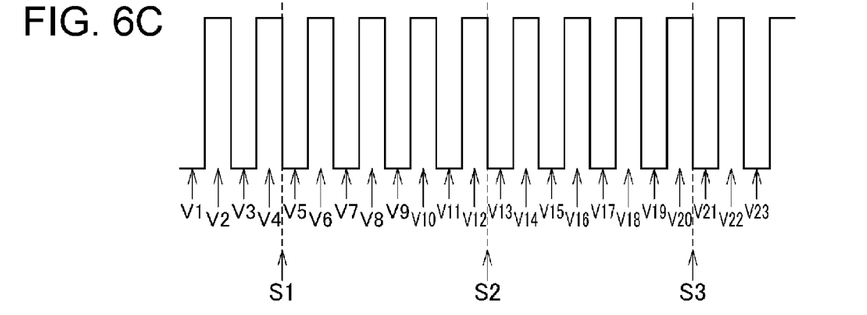

The timing controlling unit 52 generates a timing at which the communication unit 50 operates. For the timing generation, a known technique may be used. Therefore, description thereof is omitted. The timing controlling unit 52 may generate a timing synchronized with the first signal, or a timing in accordance with the transmission rate higher than that of the first signal. FIGS. 6A to 6C illustrate an outline of an operation in the communication device 32. FIG. 6A illustrates a timing in accordance with a transmission rate of 9600 bps. Here, a sampling timing is indicated by "T1" to "T6". FIG. 6B illustrates a timing in accordance with a transmission rate of 19200 bps. Here, a sampling timing is indicated by "U1" to "U11". FIG. 6C illustrates a timing in accordance with a transmission rate of 38400 bps. Here, a sampling timing is indicated by "V1" to "V23". According to FIGS. 6A to 6C, the sampling timings in a transmission rate of 9600 bps, a transmission rate of 19200 bps, and a transmission rate of 38400 bps are different from each other. Return to FIG. 5.

The confirmation unit 58 extracts an ID included in the packet signal from the receiver 56. The confirmation unit 58 confirms whether the extracted ID and the ID assigned to the communication device 32 are identical. When the IDs are identical, the confirmation unit 58 outputs information included in the packet signal, in other words, a command, to the generation unit 54. On the other hand, when the IDs are not identical, the confirmation unit 58 outputs the packet signal to the transmitter 62. This corresponds to output of the first signal to the transmitter 62.

The generation unit 54 accepts the command from the confirmation unit 58. The generation unit 54 acquires, from the battery pack 30 connected to the communication device 32, information corresponding to the command. As described above, when the command is acquisition of an SOC, the generation unit 54 accepts the SOC from the battery pack 30. The generation unit 54 stores the SOC as information, thereby generating a packet signal. At that time, as the ID, an ID assigned to the communication device 32 is used. It can also be said that the packet signal is a second signal starting from the communication device 32. The generation unit 54 outputs the generated packet signal to the acceptor 60. The acceptor 60 accepts the packet signal from the generation unit 54. The acceptor 60 determines a transmission rate of the packet signal, in other words, the second signal. Here, for the second signal, a transmission rate higher than that of the first signal is used. For example, when the maximum value of the transmission rate of the first signal is 19200 bps, a transmission rate of 38400 bps is used. In the packet signal, information regarding the battery pack 30 is included as the information. The acceptor 60 outputs the packet signal to the transmitter 62.

The transmitter 62 accepts the packet signal from the confirmation unit 58, in other words, the first signal. For the first signal, the transmission rate of the first signal upon receiving is maintained. For example, when the transmission rate upon receiving is 9600 bps, a transmission rate of 9600 bps is used, and when the transmission rate upon receiving is 19200 bps, a transmission rate of 19200 bps is used. In addition, the transmitter 62 has an electric/optical (E/O) conversion function, and converts the first signal from an electric signal to an optical signal. The transmitter 62 transmits the first signal to another communication device 32 or the storage battery management unit 20 not illustrated, in other words, the succeeding device in the daisy chain connection.

Separately, the transmitter 62 accepts the packet signal from the acceptor 60, in other words, the second signal.

The transmitter 62 converts the second signal from an electric signal to an optical signal. The transmitter 62 transmits the second signal to another communication device 32 or the storage battery management unit 20 not illustrated, in other words, the succeeding device in the daisy chain connection.

The configuration can be realized, as hardware, by a CPU, a memory, and other LSI of any computer, and as software, by a program loaded in a memory, and the like. Here, a functional block realized by cooperation of the above components is illustrated. Therefore, it is understood by a person skilled in the art that the functional block can be realized in various ways, for example, by only the hardware, or a combination of the hardware and the software.

Figure 7:
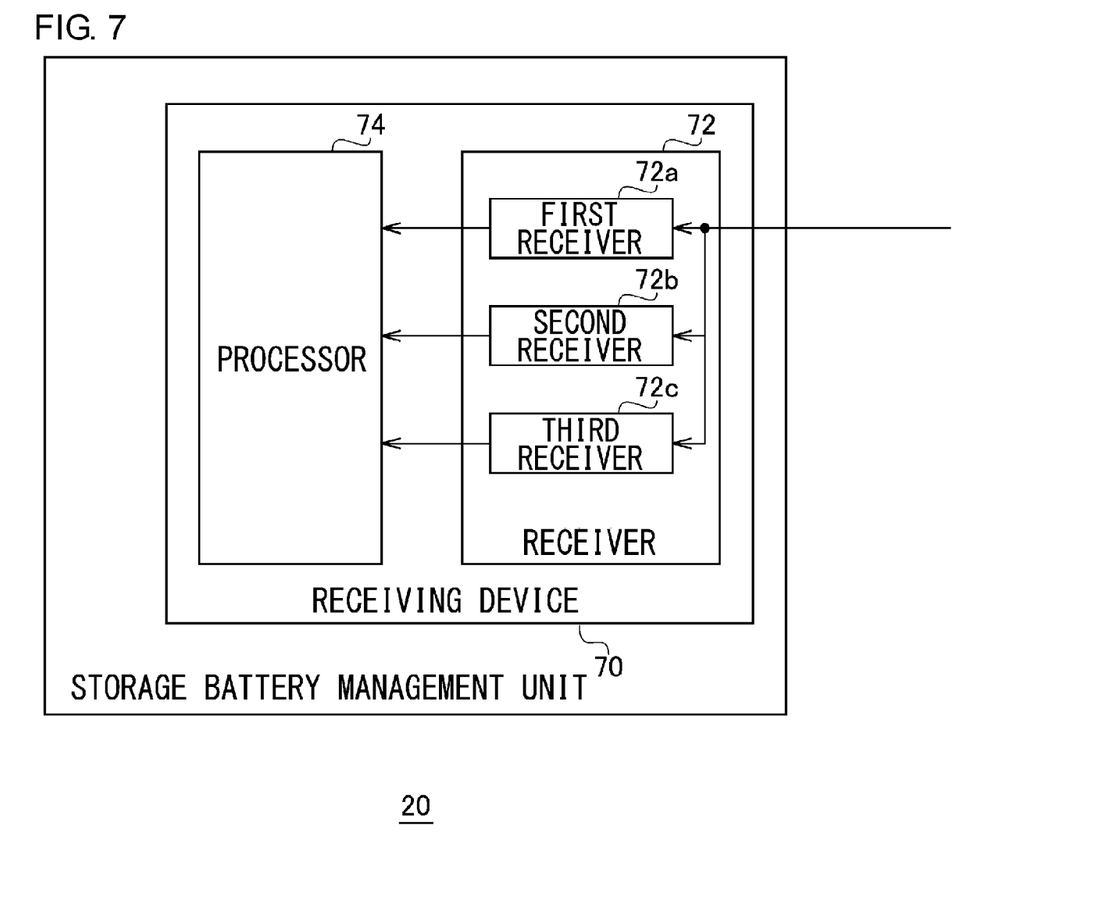
FIG. 7 is a diagram illustrating a configuration of the storage battery management unit of FIG. 2.

FIG. 7 illustrates a configuration of the storage battery management unit 20. The storage battery management unit 20 includes a receiving device 70 and a processor 74. The receiving device 70 includes a first receiver 72a, a second receiver 72b, and a third receiver 72c. The first receiver 72a, the second receiver 72b, and the third receiver 72c may be collectively referred to as a receiver 72.

The receiver 72 receives a packet signal from each of the communication devices 32 included in the daisy chain connection. The receiver 72, as with the receiver 56, converts the packet signal from an optical signal to an electric signal.

A plurality of kinds of the transmission rates is used for the packet signal. In other words, there are cases using, as a transmission rate, 9600 bps, 19200 bps, and 38400 bps. The first receiver 72a processes the packet signal at a rate of 9600 bps.

This corresponds to sampling at a timing of "T1" to "T6" of FIG. 6A.

The second receiver 72b processes the packet signal at a rate of 19200 bps and the third receiver 72c processes the packet signal at a rate of 38400 bps. These correspond to sampling at a timing of "U1" to "U11" of FIG. 6B, and sampling at a timing of "V1" to "V23" of FIG. 6C, respectively. As described above, a reference signal for identifying a transmission rate is included in the packet signal. The reference signal for identifying a transmission rate has a common value irrespective of the transmission rate. Consequently, an accurate value of the reference signal for identifying a transmission rate is output from one of the first receiver 72a to the third receiver 72c, which uses a transmission rate identical with the transmission rate of the received packet signal. The receiver 72 selects, from the plurality of kinds of the transmission rates, a transmission rate at which the accurate value of the reference signal for identifying a transmission rate is output. The receiver 72 outputs, to the processor 74, the packet signal sampled based on the selected transmission rate. The processor 74 processes the packet signal from the receiver 72. In other words, the processor 74 extracts the ID and the information included in the packet signal, and performs control thereof as described above.

Figure 8:
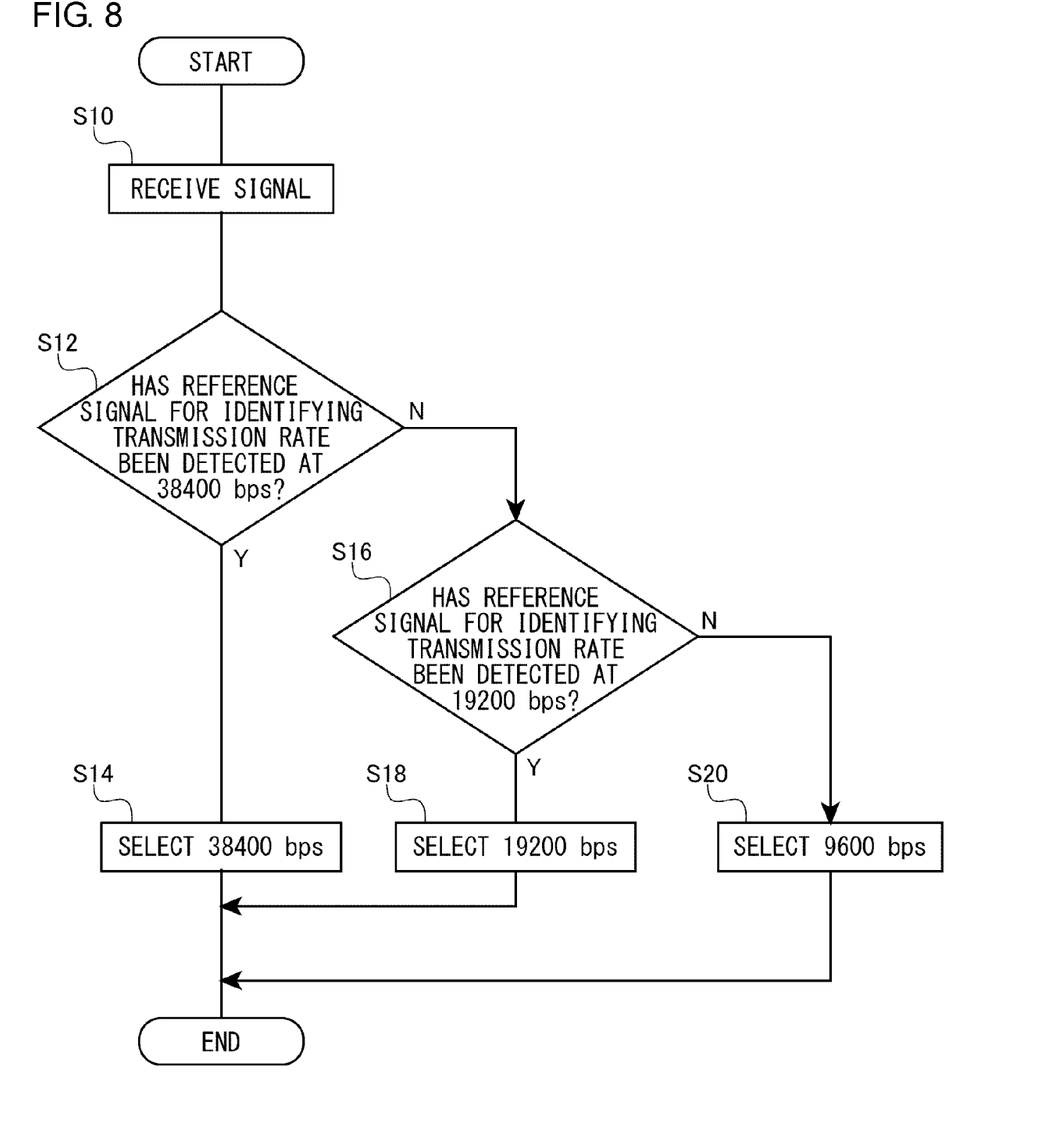
FIG. 8 is a flowchart illustrating a receiving procedure performed by the storage battery management unit of FIG. 7.

An operation of the power distribution system 100 having the above configuration is described. FIG. 8 is a flowchart illustrating a receiving procedure performed by the storage battery management unit 20. The receiver 72 receives a packet signal (S10). When a reference signal for identifying a transmission rate has been detected at a rate of 38400 bps (Y in S12), the receiver 72 selects 38400 bps (S14). When the reference signal for identifying a transmission rate has not been detected at a rate of 38400 bps (N in S12), and has been detected at a rate of 19200 bps (Y in S16), the receiver 72 selects 19200 bps (S18). When the reference signal for identifying a transmission rate has not been detected at a rate of 19200 bps (N in S16), the receiver 72 selects 9600 bps (S20).

According to the embodiment of the present invention, while maintaining a transmission rate for a packet signal to be transferred, a new packet signal is transmitted at a transmission rate higher than the transmission rate. Therefore, a time required for transmitting the new packet signal can be shortened. In addition, since the time required for transmitting the new packet signal is shortened, a transmission period added to a succeeding communication device in a daisy chain connection can be shortened.

In addition, since the transmission period added to the succeeding communication device in the daisy chain connection is shortened, a difference in power consumption between the preceding and succeeding communication devices in the daisy chain connection can be reduced. In addition, since the difference in power consumption between the preceding and succeeding communication devices in the daisy chain connection is reduced, power consumption in the daisy chain connection can be leveled.

In addition, the closer to the starting point in the daisy chain connection, the lower transmission rate is used.

Therefore, the effect of the distortion can be reduced. In addition, since the effect of the distortion is reduced, occurrence of an error can be suppressed even if the number of times of transfer is large. In addition, since the information regarding the battery pack is transmitted through the daisy chain connection, a plurality of battery packs can be controlled. In addition, since a reference signal for identifying a transmission rate, which signal has a common value irrespective of the transmission rate, is included in the packet signal, the reference signal for identifying a transmission rate can be used for determining a transmission rate. In addition, since a signal is received at each of a plurality of kinds of transmission rates and a transmission rate at which a reference signal for identifying a transmission rate has been detected is selected, the transmission rate can be determined automatically.

An outline of an aspect of the present invention is as follows. A communication device 32 in an aspect of the present invention is included in a daisy chain connection, and includes a receiver 56, a transmitter 62, and an acceptor 60.

The receiver 56 receives a first signal from a preceding device in the daisy chain connection, the transmitter 62 transmits the first signal received in the receiver 56 to a succeeding device in the daisy chain connection, and the acceptor 60 accepts a second signal starting from the communication device 32. The transmitter 62 transmits the second signal to the succeeding device at a transmission rate higher than that of the first signal.

The transmitter 62 may maintain the transmission rate of the first signal when transmitting the first signal received in the receiver 56 to the succeeding device in the daisy chain connection.

The acceptor 60 may determine a transmission rate.

The communication device 32 is connected to the battery pack 30, and information regarding the battery pack 30 is included in the second signal accepted in the acceptor 60.

In the first signal and the second signal transmitted from the transmitter 62, a reference signal for identifying a transmission rate, which signal has a common value, is included.

Another aspect of the present invention is a receiving device 70. The device includes a receiver 72 and a processor 74. The receiver 72 receives a signal from each of a plurality of communication devices 32 included in a daisy chain connection, for which signal a plurality of kinds of transmission rates is used. The processor 74 processes the signal received in the receiver 72. In the signal received in the receiver 72, a reference signal for identifying a transmission rate, which signal has a common value irrespective of the transmission rate, is included.

The receiver 72 receives the signal at each of the plurality of kinds of transmission rates, and selects a transmission rate at which the reference signal for identifying a transmission rate has been detected.

Still another aspect of the present invention is a communication system 80. The communication system 80 includes a storage battery management unit 20, and a plurality of communication devices 32 daisy-chained from the storage battery management unit 20. Each of the plurality of communication devices 32 transfers a signal received from a preceding device in the daisy chain connection to a succeeding device in the daisy chain connection, and transmits, to the succeeding device, a signal starting from the communication device 32 at a transmission rate higher than that used for the transfer.

A reference signal for identifying a transmission rate, which signal has a common value irrespective of the transmission rate, is included in the signal in the daisy chain connection. The storage battery management unit 20 may receive the signal at each of a plurality of kinds of transmission rates used in the daisy chain connection, and select a transmission rate at which the reference signal for identifying a transmission rate has been detected.

The present invention has been described above based on the embodiment. The embodiment is for illustrative purposes, and it is understood by a person skilled in the art that various modifications are possible for combinations of respective components or respective processing processes thereof, and that such modifications are also included in the scope of the present invention.

In the embodiment of the present invention, there are three kinds of transmission rates, i.e. 9600 bps, 19200 bps, and 38400 bps. However, the transmission rate is not limited thereto, and values other than the above may be employed. In addition, the number of kinds of the transmission rates may not necessarily be three. According to the modification, the degree of freedom of a configuration can be increased.

In the embodiment of the present invention, different transmission rates are used for the packet signals starting from a plurality of the daisy-chained communication devices 32. However, there is no limitation thereto. For example, the same transmission rate may be used for the packet signals starting from adjacent communication devices 32. According to the modification, a larger number of communication devices 32 than the number of kinds of the transmission rates can be daisy-chained.

In the embodiment of the present invention, the communication system 80 is connected to the battery pack 30, and transmits information regarding the battery pack 30. However, there is no limitation thereto. For example, the communication system 80 may not necessarily be connected to the battery pack 30. According to the modification, the communication system 80 can transmit any information.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A communication device included in a daisy chain connection of communication devices, the communication device comprising:
   a receiver that receives a first signal from a preceding communication device in the daisy chain connection;
   a transmitter that transmits the first signal received in the receiver to a succeeding communication device in the daisy chain connection at a transmission rate; and
   an acceptor that accepts a second signal originating from the communication device and not the preceding communication device, wherein
   the transmitter transmits the second signal to the succeeding communication device at a transmission rate higher than the transmission rate of the first signal.

2. The communication device according to claim 1, wherein the transmitter maintains the transmission rate of the first signal when transmitting the first signal received in the receiver to the succeeding communication device in the daisy chain connection.

3. The communication device according to claim 1, wherein the acceptor determines the transmission rate of the second signal.

4. The communication device according to claim 2, wherein the acceptor determines the transmission rate of the second signal.

5. The communication device according to claim 1, wherein
the communication device is connected to a battery pack, and
the second signal accepted in the acceptor includes information regarding the battery pack.

6. The communication device according to claim 2, wherein
the communication device is connected to a battery pack, and
the second signal accepted in the acceptor includes information regarding the battery pack.

7. The communication device according to claim 3, wherein
the communication device is connected to a battery pack, and
the second signal accepted in the acceptor includes information regarding the battery pack.

8. The communication device according to claim 4, wherein
the communication device is connected to a battery pack, and
the second signal accepted in the acceptor includes information regarding the battery pack.

9. The communication device according to claim 1, wherein a reference signal for identifying a corresponding transmission rate, which reference signal has a common value, is included in the first signal and the second signal transmitted from the transmitter.

10. The communication device according to claim 2, wherein a reference signal for identifying a corresponding transmission rate, which reference signal has a common value, is included in the first signal and the second signal transmitted from the transmitter.

11. The communication device according to claim 3, wherein a reference signal for identifying a corresponding transmission rate, which reference signal has a common value, is included in the first signal and the second signal transmitted from the transmitter.

12. The communication device according to claim 4, wherein a reference signal for identifying a corresponding transmission rate, which reference signal has a common value, is included in the first signal and the second signal transmitted from the transmitter.

13. The communication device according to claim 5, wherein a reference signal for identifying a corresponding transmission rate, which reference signal has a common value, is included in the first signal and the second signal transmitted from the transmitter.

14. The communication device according to claim 6, wherein a reference signal for identifying a corresponding transmission rate, which reference signal has a common value, is included in the first signal and the second signal transmitted from the transmitter.

15. The communication device according to claim 7, wherein a reference signal for identifying a corresponding transmission rate, which reference signal has a common value, is included in the first signal and the second signal transmitted from the transmitter.

16. The communication device according to claim 8, wherein a reference signal for identifying a corresponding transmission rate, which reference signal has a common value, is included in the first signal and the second signal transmitted from the transmitter.

17. A receiving device comprising:
a receiver that receives a signal from any of a plurality of communication devices included in a daisy chain connection, the signal including any of a plurality of different transmission rates; and
a processor that processes the signal received in the receiver, wherein
in the signal received in the receiver, a reference signal for identifying the transmission rate of the signal received in the receiver, which reference signal has a common value irrespective of the transmission rate, of the signal received in the receiver, is included, and
the receiver receives the signal at each of the plurality of different transmission rates, and selects a transmission rate at which the reference signal for identifying the transmission rate has been detected.

18. A communication system comprising:
a management circuit; and
a plurality of communication circuits in a daisy chain connection and coupled to the management circuits, wherein
each of the plurality of communication circuit transfers a signal received from a preceding communication circuit in the daisy chain connection to a succeeding communication circuit in the daisy chain connection, and transmits, to the succeeding communication circuit, a signal originating from the communication circuit and not the preceding communication circuit at a transmission rate higher than a transmission rate used for the transfer.

19. The communication system according to claim 18, wherein
a reference signal for identifying the transmission rate, which reference signal has a common value irrespective of the transmission rate, is included in the signal in the daisy chain connection, and
the management circuit receives the signal at each of a plurality of different transmission rates used in the daisy chain connection, and selects a transmission rate at which the reference signal for identifying the transmission rate has been detected.

* * * * *